UNITED STATES PATENT OFFICE.

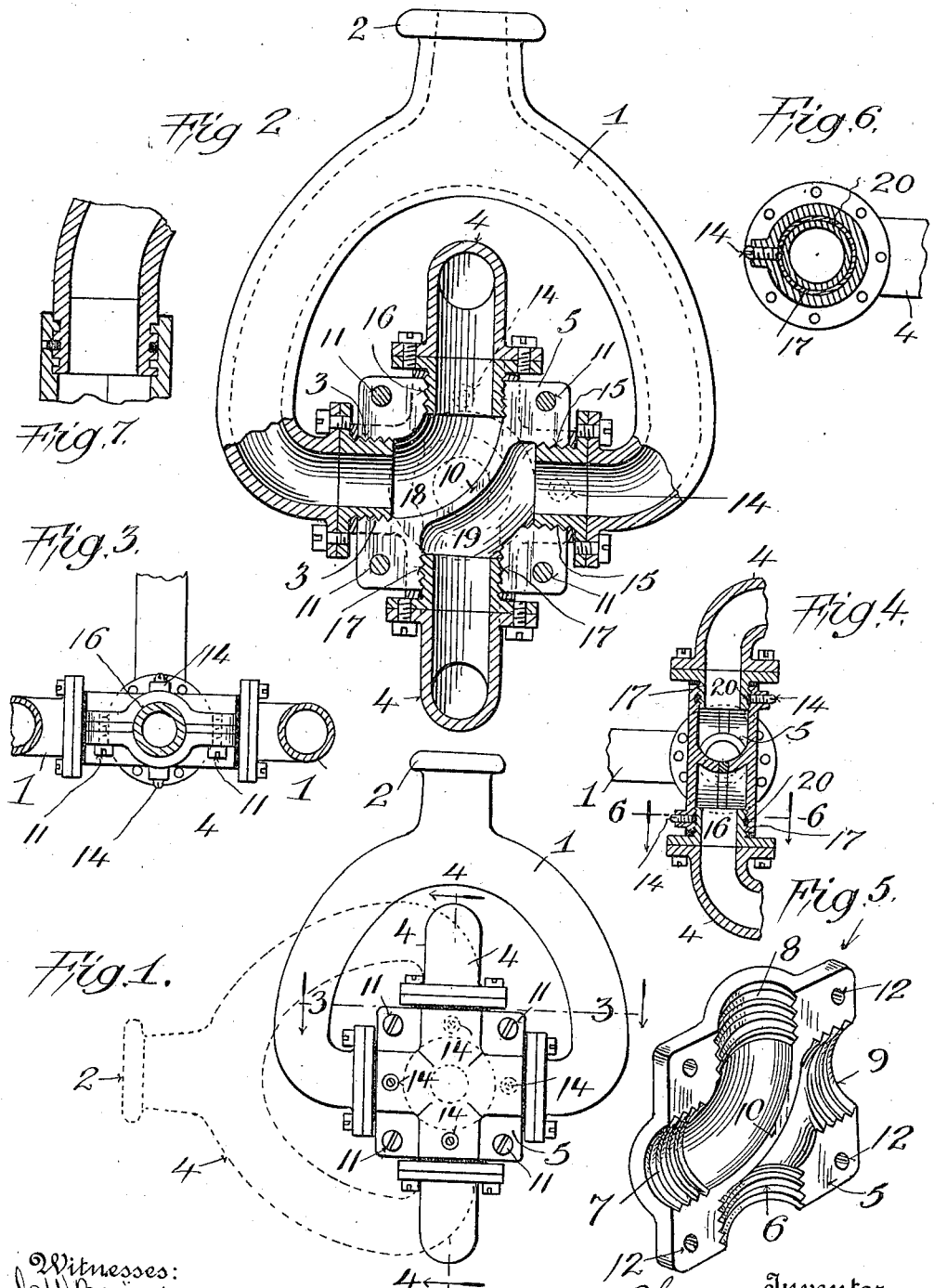
C. G. CUNNINGHAM.
UNIVERSAL JOINT FOR STEAM, GAS, OR OTHER PIPES.
APPLICATION FILED FEB. 7, 1914.
1,181,437. Patented May 2, 1916.

CHARLES G. CUNNINGHAM, OF NEW YORK, N. Y.

UNIVERSAL JOINT FOR STEAM, GAS, OR OTHER PIPES.

1,181,437.   Specification of Letters Patent.   Patented May 2, 1916.

Application filed February 7, 1914. Serial No. 817,115.

*To all whom it may concern:*

Be it known that I, CHARLES G. CUNNINGHAM, a citizen of the United States, residing in New York, county and State of New York, have made a certain new and useful Invention in Universal Joints for Steam, Gas, or other Pipes, of which the following is a specification.

This invention relates to universal joints for steam, gas or other pipes.

The object of the invention is to provide a joint which is universal in operation, to connect pipes for handling steam, gas or other medium, having the same flexibility as the commercial universal joints employed in connection with shaftings, rods and the like.

Another object of the invention is to provide a universal joint capable of replacing flexible hose which is now used in connection with high pressure steam, water or gas pipes.

Another object is to provide a universal joint which is practical, economical to manufacture and practically indestructible in use.

The invention consists substantially in the combination, location, construction and relative arrangement of parts, all as will be more fully hereinafter set forth as shown in the drawing and finally pointed out in the appended claims.

Referring to the accompanying drawing:—Figure 1 is a view showing a universal joint embodying the principles of my invention. Fig. 2 is a similar view, parts broken away and parts in section, showing the construction of universal joint forming my invention. Fig. 3 is a broken detail view in section, taken on the line 3—3, Fig. 1. Fig. 4 is a similar view on the line 4—4, Fig. 1. Fig. 5 is a perspective of the inner side of one of the connecting plates used in carrying out my invention. Fig. 6 is a detail view in section on the line 6, 6, Fig. 4. Fig. 7 is a broken detail view in section showing a slightly modified construction.

The same part is designated by the same reference sign wherever it appears throughout the several views.

In carrying out my invention I employ a yoke 1 which is adapted to be screwed to a pipe connection at 2. The arms of the yoke 1 are cored and at their terminals have trunnions as indicated at 3 and 15. These trunnions may be formed on or applied to the ends of the yoke arms in any suitable or convenient manner. I have shown a simple illustrative arrangement wherein the trunnions constitute separate pieces from the yoke arms, and are secured to and form continuations of the yoke arm ends, by means of flanges formed on the yoke ends and trunnions, respectively and bolted together, as shown. Another yoke of similar construction is indicated at 4 and has the same connection 2 in which a pipe is adapted to be screwed, and trunnions 16, 17. The two yokes are assembled in such relation to each other that the axis afforded by the trunnions 3, 15, intersect that afforded by the trunnions 16, 17, at right angles. The two yokes are maintained in the assembled relation to which each is permitted free swinging movement on the axis of its trunnions, by means of plates 5, one of which is shown in Fig. 5. Each of these plates on its inner side is provided with seats 6, 7, 8 and 9, which correspond respectively with and in assembled relation fit over one half the periphery of the trunnions 17, 3, 16 and 15. Each plate 5 also has a baffle or dividing wall 10, which is curved diagonally across it and which separates the seats 7 and 8 from the seats 9 and 6. The two plates 5 are placed together so that the edge of the dividing wall 10 of one plate rests against that of the dividing wall 10 of the other plate, and also so that the seats 7 and 8 of one plate fit one half around the trunnions 3 and 16, of yokes 1 and 4 respectively and the seats 9 and 6, fit around one half the trunnions 15 and 17 of the yokes 1 and 4. The seats in the other plate fit over, in like manner, the other halves of the trunnions as will be readily understood. The two plates are then secured together by suitable screws 11 which are inserted through holes 12 in the plates, as shown.

In order to permit the free rocking movements of the yoke trunnions in their seats in the clamping plates, and at the same time to maintain an efficient tight joint and prevent the steam, gas, water or other medium being handled, from escaping through the joints, I provide means for packing said joints. A simple arrangement for this purpose is shown wherein I form projections extending peripherally around the exterior surface of the trunnions at the yoke, and I form correspondingly shaped and arranged grooves in the seats of the clamp plates to receive said projections. I have found that V-shaped projections and grooves well answer the purpose. If desired, and in order to insure against leakage at the joint even when high pressure medium is being handled through the joint, I propose in one form of my invention, to provide for additionally packing the trunnion joints. This, in the present instance, I accomplish by cutting down or shortening one of the peripheral projections of the trunnions as indicated at 20 thereby forming a raceway to receive a packing, such, for example, as soft lead shot or the like, indicated at 17, and tapping a screw 14 through the plates 5 to act upon the packing in said raceway.

It will be seen that by this construction, a pipe fitted in yoke 1 at 2 and leading for instance from the source of supply of steam, gas or other medium, will enable the medium to flow through both arms of the cored yoke 1. The dividing wall 10 of the plates 5 directs the flow of the medium through the two arms through separate channels 18 and 19 to the terminals of the arms of the yoke 4. The medium then flows through the arms of yoke 4 until it is delivered to a pipe connected to yoke 4 at 2. By keeping the flow of the two arms of the yokes separated enables an unobstructed flow of the medium to be secured through the joint and thus gives increased velocity. By connecting two or more of these yokes by suitable lengths of pipe a flexible hose is produced which is strong and practically indestructible and of great advantage for it reduces the danger of bursting to a minimum.

Instead of the V-shaped projections and correspondingly shaped grooves, shown in Figs. 2, 4 and 5, and above referred to, as forming the joints at the ends of the yoke arms, these projections and grooves may be of any other suitable or desired shape or contour in cross section. Thus in Fig. 7 I have shown an arrangement wherein the grooves and projections are of rectangular contour, and by omitting one of the projections and filling the resulting raceway with packing material, such as lead or the like, I am enabled to secure excellent results and desirable mechanical and manufacturing advantages.

Having now set forth the objects and nature of my invention and a construction embodying the principles thereof, what I claim as new and useful and of my own invention, and desire to secure by Letters Patent is:—

1. A universal joint for connecting pipes through which steam or other medium flows, comprising a pair of cored yokes pivotally connected together by a pair of plates having semicircular seats to correspond with and fit over the corresponding ends of the two yokes, said yokes and seats being correspondingly grooved to permit axial rotation of the ends of said yokes therein without leakage.

2. A universal joint for connecting pipes through which steam or other medium flows, comprising a pair of hollow yokes the ends of said yokes being grooved and adapted to be received between the grooves of a pair of plates which are fitted around said grooved ends of said yokes so that the ends of said yokes are received in the grooves and are axially rotatable therein, said connection between the ends of the pair of yokes and the securing plate forming a packing to prevent the escape of the medium while passing through the joint.

3. A universal joint for connecting pipes through which steam, gas or other medium flow, comprising a pair of cored yokes with grooved and trunnioned terminals, plates having grooved seats to fit over said grooved terminals and to pivotally secure the yokes together and a dividing wall in said plates to deflect the flow from the arms of one yoke into corresponding arms of the other yoke.

4. A universal joint for connecting pipes through which steam, gas or other medium flow, comprising a pair of cored yokes with trunnioned terminals having peripheral projections, a projection of each terminal being cut down or reduced to form a raceway, a pair of plates having seats to fit over the terminals of said yokes and to secure them together, a packing inserted in the raceway and a screw passing through one of said plates to bear against said packing.

In testimony whereof I have hereunto set my hand in the presence of the subscribing witnesses, on this 6th day of February A. D., 1914.

CHARLES G. CUNNINGHAM.

Witnesses:
WALTER A. DARBY,
ISABEL LEVINSON.

Copies of this patent may be obtained for five cents each, by addressing the "Commissioner of Patents, Washington, D. C."